United States Patent [19]
Irvine

[11] 3,766,787
[45] Oct. 23, 1973

[54] ACCELEROMETER FOR MEASURING ANGULAR ACCELERATIONS

[75] Inventor: John Anderson Irvine, Midlothian, Scotland

[73] Assignee: Brown Brothers & Company Limited, Edinburgh, Scotland

[22] Filed: July 1, 1971

[21] Appl. No.: 158,880

[52] U.S. Cl. ............................. 73/516 R, 73/517 A
[51] Int. Cl. ............................................ G01p 15/08
[58] Field of Search ............. 73/516 R, 514, 517 A, 73/517 R, 517 B, 398 R; 318/676, 689; 336/30; 323/44, 45

[56] References Cited
UNITED STATES PATENTS

| | | | |
|---|---|---|---|
| 2,656,519 | 10/1953 | Sheppard | 73/517 A X |
| 3,362,229 | 1/1968 | Trueblood | 73/505 |
| 2,942,476 | 6/1960 | Turner | 73/517 A |
| 3,507,158 | 4/1970 | Wilcox et al. | 73/517 B |
| 3,075,389 | 1/1963 | Lear, Sr. | 336/30 X |
| 2,669,126 | 2/1954 | Simmons et al. | 74/5.6 |

Primary Examiner—James J. Gill
Attorney—Woodhams, Blanchard & Flynn

[57] ABSTRACT

An angular accelerometer comprises a rotor rotatably supported in a stator by air bearings. An inductive sensor is mounted on the stator and arranged to detect displacement of the rotor from a datum relative to the stator. A torquer, comprising two coils connected in a circuit so that the currents through the coils can be varied differentially, is also mounted on the stator. The sensor and torquer are disposed transversely of a cooperating ferromagnetic bar which extends transversely on the rotor. The sensor includes two coils and has an associated source of oscillating flux so arranged that the reluctance between the source and the two coils is varied differentially when the rotor is displaced. The sensor coils are connected through a differential amplifier and a phase-sensitive detector to the torquer. The current in the torquer coils is varied differentially in response to variations of the signal from the phase-sensitive detector to produce a torque on the rotor proportional to the angular acceleration of the stator to maintain the rotor substantially in its datum position. An output provides a signal proportional to the torque to indicate the angular acceleration. The spacing between the torquer and the ferromagnetic bar is much greater than the spacing between the sensor and the bar so that there is substantially no change of reluctance between the torquer coils and the bar on a change of angular acceleration of the stator.

13 Claims, 6 Drawing Figures

3,766,787

PATENTED OCT 23 1973

INVENTOR
JOHN ANDERSON IRVINE

BY Woodhams, Blanchard & Flynn
ATTORNEYS

Fig. 3.

ACCELEROMETER FOR MEASURING ANGULAR ACCELERATIONS

The present invention relates to an accelerometer for measuring angular acceleration and is mainly concerned with providing an accelerometer for use on ships.

Good stabilising of the rolling motion of a ship requires the values of roll angle, roll velocity and roll acceleration to be known continuously. Integrating amplifiers enable the roll velocity and roll angle to be determined by successive integrations from measurements of the roll acceleration. It is therefore necessary only to obtain a satisfactory measurement of the roll acceleration.

In a known accelerometer, a rotor is freely mounted in a stator which is secured to the structure whose angular acceleration is to be measured. When the stator is subjected to an acceleration, the inertia of the rotor causes it to be displaced relative to the stator. A pick up senses the displacement and, through a servo circuit and a torquer, produces a couple on the rotor to maintain it substantially in a datum position relative to the stator. The couple is proportional to the angular acceleration and thus an indication of the couple gives an indication of the angular acceleration.

Unfortunately, the known forms of this accelerometer suffer from practical difficulties and accordingly, it is an object of the present invention to provide a construction of accelerometer which alleviates these difficulties.

According to the present invention there is provided an accelerometer for measuring angular accelerations comprising a rotor rotatably supported in a stator, an inductive sensor arranged to detect displacement of the rotor from a datum relative to the stator, and an inductive torquer including two coils, both the sensor and the torquer being mounted on the stator and allowing limited rotation of the rotor relative to the stator, the sensor and the torquer each being disposed transversely of a cooperating portion of the rotor, the sensor having an associated source of oscillating flux so arranged that rotation of the rotor relative to the stator varies the reluctance between the source and the sensor and being connected through a phase-sensitive detector to the torquer to vary the currents passing through the two coils differentially so that they produce a torque on the rotor proportional to the angular acceleration of the stator to maintain the rotor substantially in its datum position, an output providing a signal proportional to the torque, and the spacing between the torquer and the cooperating portion of the rotor being greater than the spacing between the sensor and the cooperating portion so that there is substantially no change of reluctance between the torquer coils and the portion of the rotor on a change of angular acceleration of the stator.

Preferably the rotor is supported by an air bearing in order that the resistance of the rotor to rotational accelerations about its axis shall be extremely small.

The sensor may be an electromagnetic sensor. In one arrangement, a bar of ferromagnetic material is mounted transversely of the rotor. First and second coils are arranged on the stator on the same side of the bar at positions on opposite sides of and equidistant from the axis of the rotor. A third coil fed with an oscillating voltage is located equidistant from the first and second coils. Preferably the first and second coils are indentical. When the bar is equidistant from the two coils the voltages induced in them will be the same. When the rotor and the bar are displaced the voltages induced in the coils will vary differentially. The voltages across the coils, when combined differentially, produce a signal indicative of the displacement.

The torque generator may include two coils arranged on the stator on the same side of the bar at positions equidistant from and on opposite sides of the rotor axis. The coils may be fed with currents, the sum of which is constant but which vary differentially according to the signal from the sensor. Resistors may be connected in series with the coils, the output being so connected to the resistor that a signal proportional to difference of the voltages across the resistors appears at the output.

An embodiment of the invention will now be described, by way of example, with reference to the accompanying drawings of which:

Figure 3:
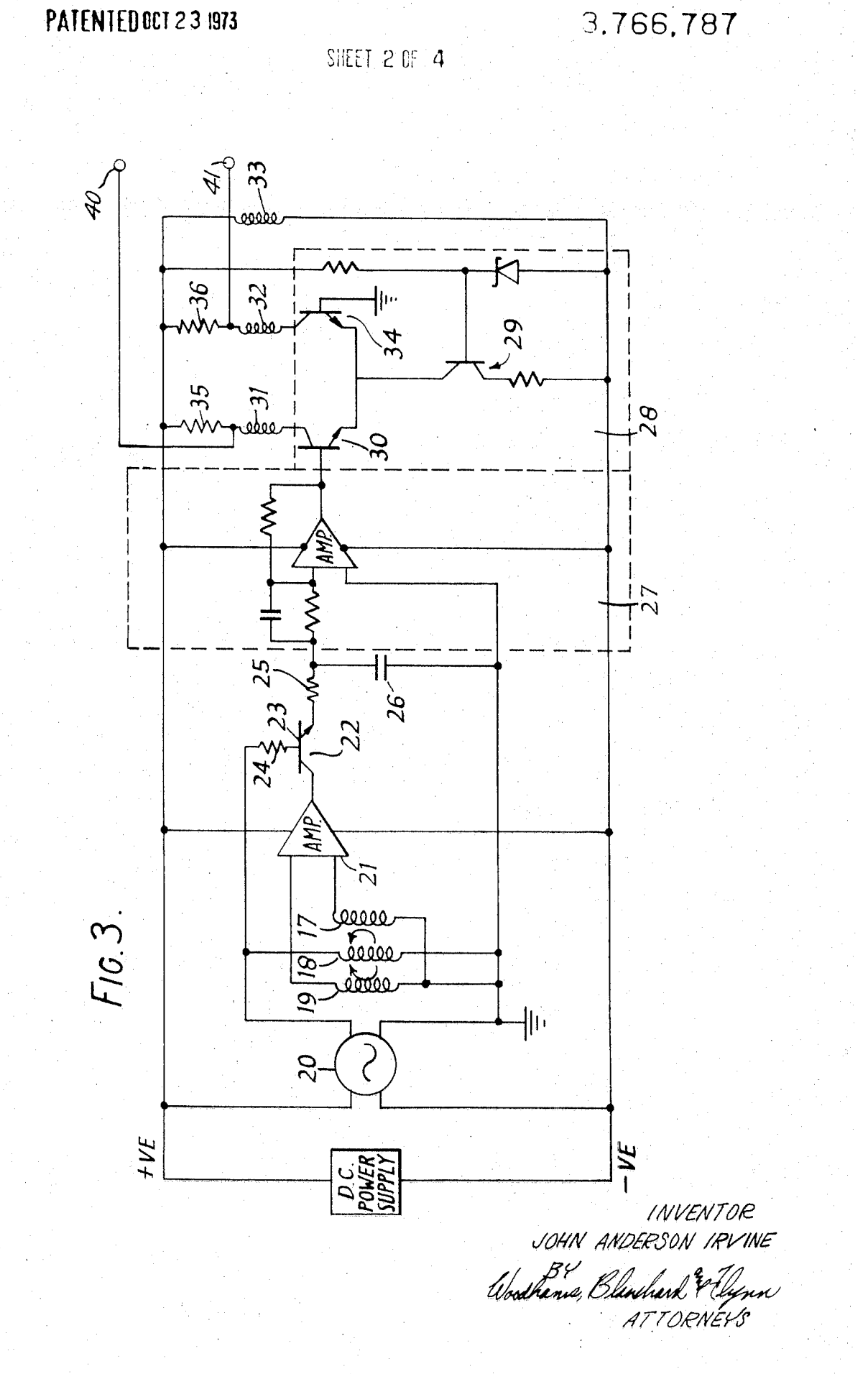

FIG. 3 shows a circuit diagram of the sensor and a torque generator of the accelerometer of FIG. 1;

Figure 1:
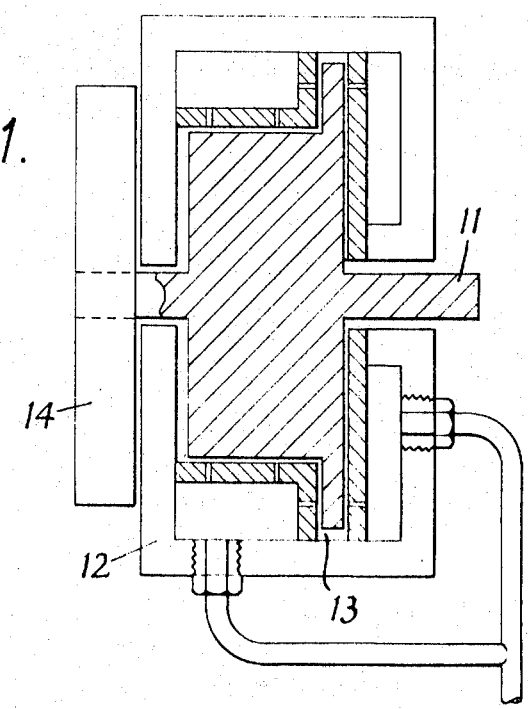
FIG. 1 shows a logitudinal cross-section of an accelerometer according to the invention.
Figure 2:
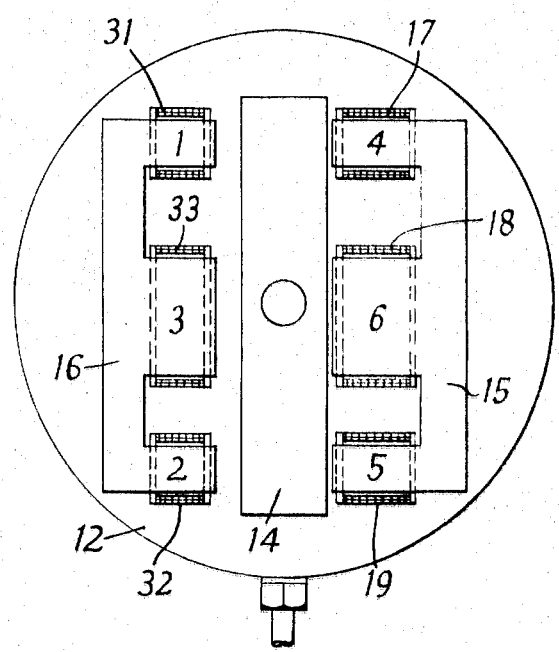
FIG. 2 shows an end view of the accelerometer of FIG. 1.
Figure 4:
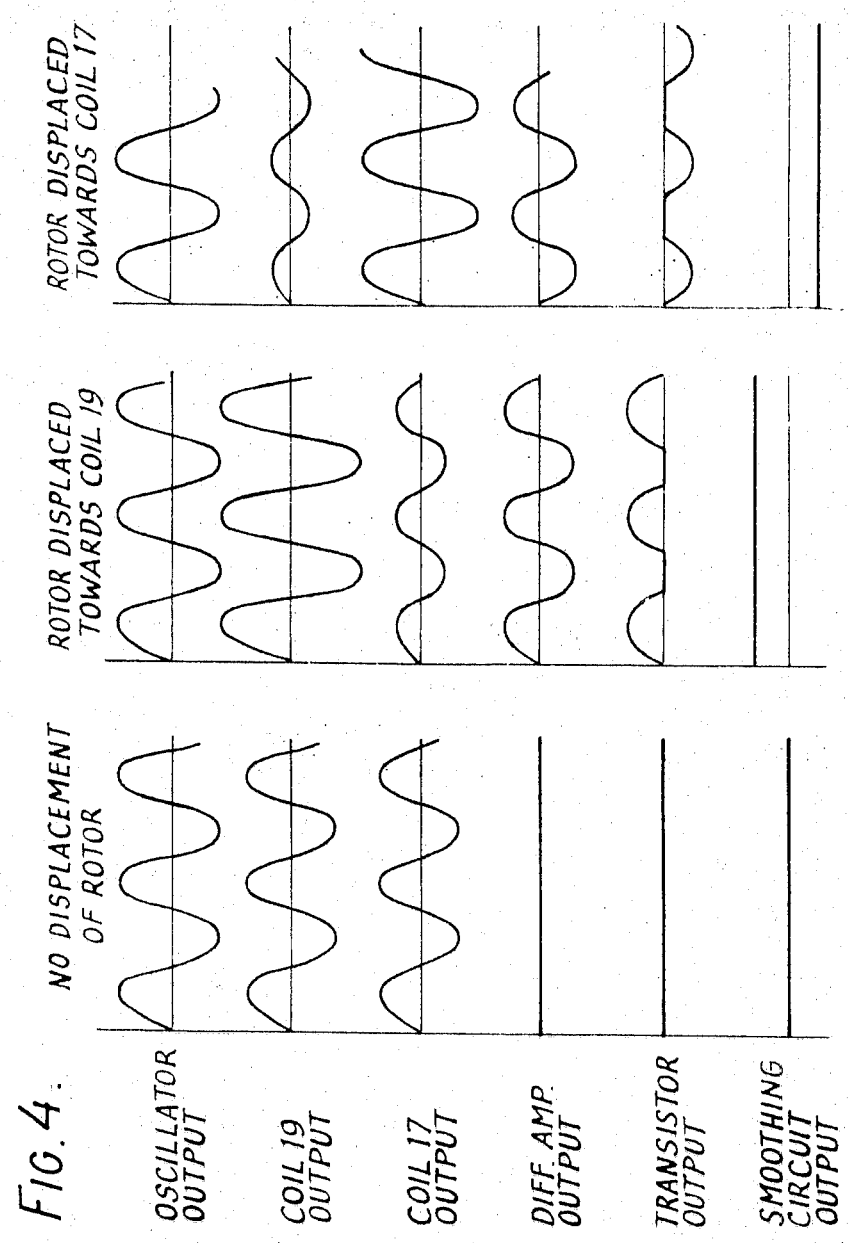
FIG. 4 shows wave forms at various parts of the circuit of FIG. 3.

An accelerometer comprises a dynamically balanced rotor 11 supported both radially and axially in a stator 12 by air bearings 13. Attached to the rotor 11 is a balanced rectangular bar 14 of soft iron. Thus the whole rotor assembly is balanced. The bar 14 is situated between, on the other hand, a sensor 15 mounted on the stator which detects displacement of the rotor relative to the stator and, on the other hand, a torque generator 17 also mounted on the stator which can exert a torque on the bar 14 and hence on the rotor 11.

Sway, heave and surge are linear accelerations, yaw, pitch and roll are angular accelerations. Because the rotor assembly 11 and 14 is balanced no displacement of the rotor results from linear accelerations. Angular accelerations of yaw and pitch are resisted by bearing stiffness. The axial and radial bearing stiffness can exceed 100,000 lb/in. The very low friction of air bearings causes the resistance of the rotor to rotational accelerations about its axis to be extremely small. The accelerometer is therefore very sensitive.

The sensor 15, comprises an E-shaped core on the limbs of which are wound three coils 17, 18 and 19. The core is symmetrical about the middle limb and the coils 17 and 19 are identical.

An oscillator 20 has its output applied to the coil 18. When the bar 14 is parallel to the faces of the limbs the reluctances of the magnetic paths between the coils 18 and 17 and 18 and 19 are the same and the flux in the limbs around which coils 17 and 19 are wound generates identical voltages in the coils. When the bar 14 is displaced relative to the stator the flux in the limbs will be unequal due to the unequal reluctances between the coils 18 and 17 and 18 and 19. Different voltages will be generated in the coils 17 and 19. The coils are so arranged that the voltages are in phase with the oscillator.

The coils 17 and 19 are connected to the input of a differential amplifier 21. The output of the differential amplifier will either be in phase with, or in antiphase with the output of the oscillator 20 according to whether the voltage across the coil 19 or the coil 17 is the greater, and hence according to the sense of rotation of the bar 14. The amplitude of the output from the differential amplifier will depend on the magnitude of the displacement of the bar 14.

The output of the differential amplifier 21 is connected to the collector of a transistor 22 which functions as a synchronous detector. The base 23 of the transistor 22 is connected to one of the output terminals of the oscillator 20 through a resistor 24. During the positive-going half-cycle of the oscillator output the base-emitter junction of the transistor 22 is forwardly biased and the collector-emitter circuit of the transistor conducts. During the negative-going half-cycle of the base-emitter junction of the transistor 22 is reversely biased and the collector-emitter circuit is rendered non-conducting. Thus, the transistor lets through the output of the differential amplifier only when the output from the oscillator is positive-going. With a rotation in one sense it is the positive-going half-cycle of the output of the differential amplifier which the transistor lets through and with a rotation in the opposite sense it is the negative-going half cycle which the transistor lets through.

The output of the transistor is passed to a smoothing circuit comprising a reistor 25 and a large capacitor 26. The smoothing circuit produces a smoothed d.c. output the magnitude of which depends on the magnitude of the displacement of the rotor and the polarity of which depends on the sense of the displacement.

The smoothed output is fed to an amplifier 27 which introduces a frequency dependent phase lead, to stabilise control in accordance with normal serve design.

The output of the amplifier 27 is fed to a push-pull power amplifier 28 in the form of a long-tailed pair with a constant current circuit 29 in its common emitter circuit. The output of the amplifier 27 is connected across the bases of the transistors 30 and 34 of the long-tailed pair.

The torque generator 16 comprises an E-shaped core with three coils 31, 32 and 33 wound around the three limbs of the core. The coils 31 and 32 are identical and are connected in the collector circuits of the transistors 30 and 34. Due to the constant current circuit 29, the sum of the currents $I_1$ and $I_2$ in the collector circuits is constant. In series with the coils 31 and 32 in the collector circuits are two resistors 35 and 36. The reisistors 35 and 36 are equal and therefore the potential drop across them is proportional to the currents $I_1$ and $I_2$.

The coil 33 is connected directly across the d.c. supply 37 and is therefore fed with a constant current $I_3$.

Figure 5:
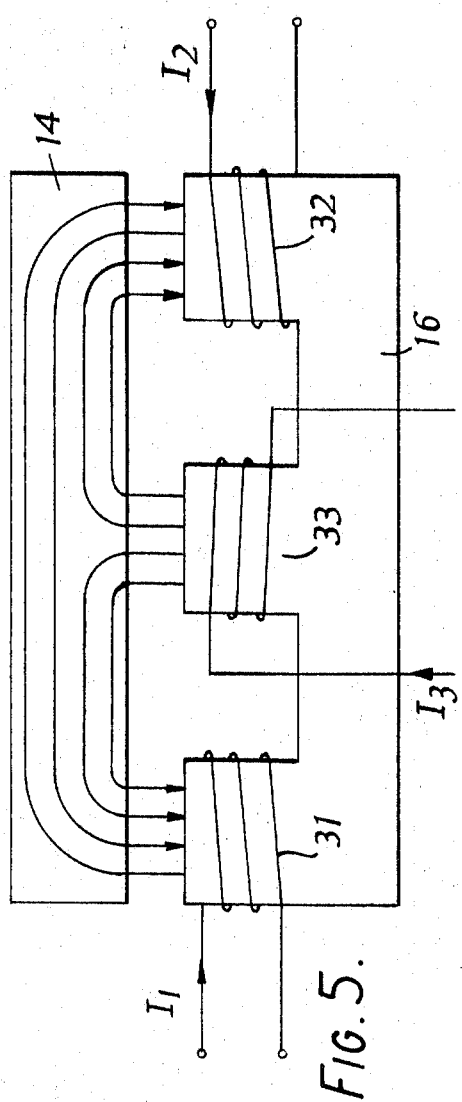
FIG. 5 shows the torque generator.

FIG. 5 shows the torque generator 16, the bar 14 and lines of force caused by the currents $I_1$, $I_2$ and $I_3$. As the air gap between the bar and the torque generator is large with respect to the movements to which the bar is likely to be subjected, the reluctance of the magnetic paths between the coils is effectively constant.

The flux density in the central limb can be expressed:

$$\beta_3 = 0_{33} + 0_{32} + 0_{31}$$

where $0_{31}$ is the flux in the limb surrounded by the coil 33 caused by the current $I_1$ in the coil 31 and $0_{32}$ is the flux in the limb surrounded by the coil 33 caused by the current $I_2$ in coil etc.

$$\beta_3 = K'I_3 + K_1 I_2 + K_1 I_1 = K'I_3 + K_1(I_2 + I_1)$$

where $K_1$ is a constant dependent on the reluctance of the magnetic paths between the coils 31 and 33 and 32 and 33, and $K'$ is a constant. Since $I_3$ and $I_1 + I_2$ are constant, $\beta_3$ is constant. The bar experiences no torque from the central limb. The flux density in the limb surrounded by the coil 31 is given:

$\beta_1 = 0_{11} + 0_{12} + 0_{13}$ $= K_2 I_1 - K_3 I_2 + K_1 I_3$, $K_2$ and $K_3$ being constants.

Similarly the flux density in the limb surrounded by the coil 32 is given:

$\beta_2 = 0_{22} + 0_{21} + 0_{23}$ $= K_2 I_2 - K_3 I_1 + K_1 I_3$.

The force exerted on the bar by the limb 1 surrounded by the coil 31 is proportional to $\beta_1^2$ and by the limb surrounded by the coil 32 is proportional to $\beta_2^2$. The torque T on the bar is therefore proportional to $\beta_1^2 - \beta_2^2$.

$T = K_4 [\beta_1 + \beta_2][\beta_1 - \beta_2]$ $K_4$ is a constant $= K_4 [2K_1 I_3 + K_2 I_2 + K_2 I_1 - K_3 I_1 - K_3 I_2 \times [K_2 I_1 + K_3 I_1 - K_3 I_2 - K_2 I_2]$ $= K_4 [2K_1 I_3 + (K_2 - K_3)(I_1 + I_2)][(K_2 + K_3)(I_1 - I_2)]$ $= K (I_1 - I_2)$ where K is a constant, since $I_1 + I_2$ is a constant.

Two output terminals 40 and 41 are connected respectively to one end of the two resistors 34 and 36. Since the potential drops across the resistors 35 and 36 are proportional to $I_1$ and $I_2$ the potential difference between the output terminals 40 and 41 is proportional to $I_1 - I_2$ and hence the torque applied to the bar.

The torque T and angular acceleration $\theta$ produced by the torque are related by the equation:

$T = J\theta$, where J is the moment of inertia of the motor 11 and the bar 14 about the axis of rotation. Thus since J is constant.

$$I_1 - I_2 \; \alpha \theta$$

The potential difference between the terminals 40 and 41 is therefore proportional to the angular acceleration of the rotor caused by the torque generator. By virtue of the closed loop established by the circuit described, the torque generator 2 produces a torque which will substantially maintain the bar, and hence the rotor, at its datum position by causing an acceleration which is proportional to and opposite to the acceleration relative to the stator caused by the rolling motion. Thus the output at the terminals 40 and 41 is proportional to the roll acceleration.

Figure 6:
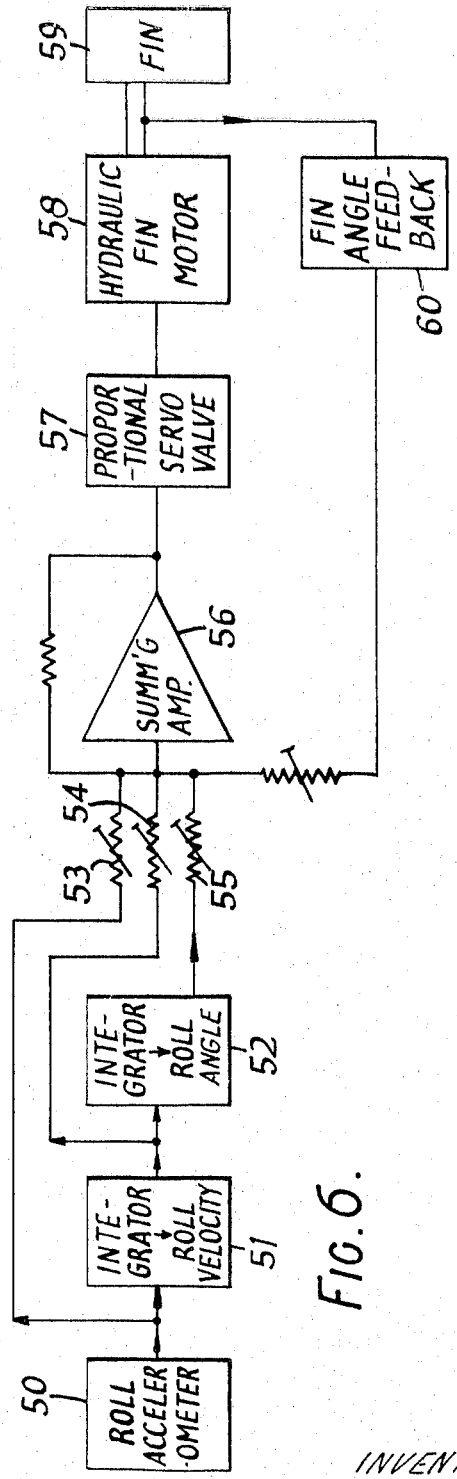
FIG. 6 shows an arrangement for stabilising a ship including the accelerometer shown in FIGS. 1 to 5.

FIG. 6 shows an arrangement where the accelerometer of FIGS. 1 to 5 is used for stabilising a ship. The accelerometer, indicated by reference numeral 50, is connected to an integrating amplifier 51, which in turn is connected to a further integrating amplifier 52. The outputs of the integrating amplifiers 51 and 52 are proportional to the roll velocity and roll angle. The outputs of the accelerometer 50 and the integrating amplifiers 51 and 52 are fed through variable resistors 53, 54 and 55 to a summing amplifier 56. The resistance of the resistors is adjusted to produce the required performance. The output of the summing amplifier is used to operate a servo valve 57 controlling a hydraulic pump which drives a hydraulic motor 58 which, in turn, operates a fin 59 of a stabiliser. The fin projects from the ship into the water and can be rotated by the hydraulic motor to produce a righting moment on the ship. A transducer 60 on the fin gives an output proportional to the fin angle and this output is fed back to the summing amplifier to close a negative feedback loop.

The integrating amplifiers reduce noise signals produced by the accelerometer thereby reducing their effect on the performance of the stabiliser. Providing the axis of the rotor is parallel to the centre-line of the ship, it may be moved anywhere in the ship without altering its output signal since the angular acceleration is constant throughout the ship. The accelerometer can resolve roll accelerations as small as 0.001 radians/sec$^2$.

What is claimed is:

1. In an accelerometer for measuring angular accelerations and including a rotor and an output for providing a signal proportional to a torque applied to such rotor, the combination comprising:

a stator;

means rotatably supporting said rotor in the stator, said rotor being dynamically balanced;

inductive sensing means to detect displacement of the rotor from a datum relative to the stator, the sensing means being disposed transversely of a cooperating portion of the rotor and having an associated source of oscillating flux so arranged that rotation of said cooperating portion of the rotor relative to the stator varies the reluctance between the source and the sensing means;

an inductive torquer disposed transversely of a cooperating portion of the rotor and including two coils, supply terminals, an input and circuit means connecting the coils to the supply terminals to vary the current in the coils differentially in response to the signal at the input, both the sensing means and the torquer being mounted on the stator and allowing limited rotation of the rotor;

a phase-sensitive detector, the sensing means being connected to the input of the torquer through the phase-sensitive detector to cause said torquer to provide said torque on the cooperating portion of the rotor disposed transversely of the torquer to maintain the rotor substantially in its datum position;

the spacing between the torquer and the cooperating portion of the rotor disposed transversely of the torquer being substantially greater than the spacing between the sensing means and the cooperating portion of the rotor disposed transversely of the sensing means, whereby there is substantially no change of reluctance between the torquer coils and the cooperating portion of the rotor disposed transversely of the torquer on a change of angular acceleration of the stator.

2. An accelerometer according to claim 1, wherein the rotor includes a ferromagnetic bar mounted transversely of the axis of rotation of the rotor, the sensing means and torquer cooperating with said ferromagnetic bar.

3. An accelerometer according to claim 2, wherein the sensing means and torquer are located on oposite sides of the ferromagnetic bar.

4. An accelerometer according to claim 1, wherein the sensing means includes two coils mounted on the stator equidistant from the axis of rotation of the rotor and the source includes an oscillator and a third coil mounted on the stator equidistant from the two sensor coils and connected to the oscillator.

5. An accelerometer according to claim 4, wherein the sensing means includes an E-shaped ferromagnetic core having two outer limbs and a central limb, the two sensing coils being mounted on the outer limbs and the third coil being mounted on the central limb of the core.

6. An accelerometer according to claim 4, including a differential amplifier the sensing coils being connected through the differential amplifier to the phase-sensitive detector.

7. An accelerometer according to claim 4, wherein the said two coils are symmetrically disposed about a plane passing through the axis of rotation of the rotor.

8. An accelerometer according to claim 1, wherein the phase-sensitive detector is a synchronous detector.

9. An accelerometer according to claim 1, wherein the two torquer coils are mounted on the stator equidistant from the axis of rotation of the rotor.

10. An accelerometer according to claim 9, including a third torquer coil mounted on the stator, the two first mentioned torquer coils being mounted equidistant from the third torquer coil.

11. An accelerometer according to claim 10, wherein the torquer includes an E-shaped ferromagnetic core having two outer limbs and a central limb, the two first mentioned torquer coils being mounted on the outer limbs and the third torquer coil being mounted on the central limb of the core.

12. An accelerometer according to claim 1, wherein the torquer coils are connected in a long-tailed pair with a constant current circuit.

13. An accelerometer according to claim 1, in which the rotor is supported in the stator by means of air bearings.

* * * * *